(12) United States Patent
Tao

(10) Patent No.: US 11,329,492 B2
(45) Date of Patent: May 10, 2022

(54) DOCKING CHARING CIRCUIT AND ELECTRONIC DEVICE

(71) Applicant: SHANGHAI YAOHUO MICROELECTRONICS Co., Ltd., Shanghai (CN)

(72) Inventor: Hongxia Tao, Shanghai (CN)

(73) Assignee: SHANGHAI YAOHUO MICROELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 17/286,485

(22) PCT Filed: Apr. 16, 2020

(86) PCT No.: PCT/CN2020/085169
§ 371 (c)(1),
(2) Date: Apr. 18, 2021

(87) PCT Pub. No.: WO2020/216126
PCT Pub. Date: Oct. 29, 2020

(65) Prior Publication Data
US 2022/0037896 A1    Feb. 3, 2022

(30) Foreign Application Priority Data

Apr. 26, 2019 (CN) .......................... 201910343818.6

(51) Int. Cl.
*H02J 7/00* (2006.01)
(52) U.S. Cl.
CPC ........ *H02J 7/0034* (2013.01); *H02J 7/00032* (2020.01); *H02J 7/00308* (2020.01); *H02J 7/007186* (2020.01)
(58) Field of Classification Search
CPC .. H02J 7/0034; H02J 7/00032; H02J 7/00308; H02J 7/007186; H02J 7/0029
(Continued)

(56) References Cited

U.S. PATENT DOCUMENTS 8,553,408 B2 * 10/2013 Supran ..................... H05K 7/00
                                                        361/679.02
9,350,197 B2 * 5/2016 Yan ................... H02J 7/007182
(Continued)

FOREIGN PATENT DOCUMENTS

CN          1402495 A       3/2003
CN        101861574 A      10/2010
(Continued)

OTHER PUBLICATIONS

International Search Report of the corresponding PCT Application No. PCT/CN2020/085169 dated Jul. 23, 2020.

*Primary Examiner* — M Baye Diao
(74) *Attorney, Agent, or Firm* — NZ Carr Law Office PLLC

(57) ABSTRACT

The invention provides a docking charging circuit and an electronic device, including a power supply side module and a receiving side module that can be docked with each other, wherein the power supply side module further includes a power supply side drive unit, a power generating unit, a first switch unit and a first intermediate terminal, and the receiving side module further includes a second intermediate terminal, a first resistance circuit and a second resistance circuit, with the control of the first switch unit by the power supply side drive unit, the first switch unit can be controlled to be turned on when in positive connection to realize power supply, and the first switch unit can be controlled to be turned off when in reverse connection to avoid damage to the devices in the power supply side module and the receiving side module caused by power supply during the reverse connection.

17 Claims, 3 Drawing Sheets

(58) Field of Classification Search
USPC .......................................................... 320/162
See application file for complete search history.

(56) References Cited

U.S. PATENT DOCUMENTS

| | | | |
|---|---|---|---|
| 10,965,145 B2* | 3/2021 | Suzuki | H02J 7/00714 |
| 2003/0030412 A1* | 2/2003 | Matsuda | H02J 7/342 |
| | | | 320/127 |
| 2014/0152237 A1 | 6/2014 | Yan | |

FOREIGN PATENT DOCUMENTS

| | | |
|---|---|---|
| CN | 108631373 A | 10/2018 |
| CN | 110112800 A | 8/2019 |
| CN | 209994125 U | 1/2020 |

* cited by examiner

DOCKING CHARING CIRCUIT AND ELECTRONIC DEVICE

TECHNICAL FIELD

The present invention relates to the field of an electronic device, in particular, to a docking charging circuit and an electronic device.

BACKGROUND

In various electronic products, wired charging can usually be performed through the contacts in the charging interface, which may be for example a USB interface or a traditional positive and negative bipolar power interface, etc., or directly through the contacts. The method of charging directly through the contacts can be applied to a few mobile phones without a standard charging interface, some charging back clips, or other electronic devices that can support wired charging, which may be for example a wearable device such as a watch and a bracelet.

In the prior art, the docking charging circuit for wired charging can use the power supply side module to supply power to the battery power supply unit in the receiving side module to achieve the purpose of charging the battery, wherein the power supply side module can use the voltage output terminal and the first ground terminal to be docked with the voltage input terminal and the second ground terminal of the receiving side module to supply power to the battery power supply unit, the voltage output terminal and the voltage input terminal can be connected with each other by corresponding metal contacts, and corresponding metal contacts can be used to achieve conduction between the first ground terminal and the second ground terminal.

However, if the power supply side module is reversely connected to the receiving side module, e.g., the voltage output terminal is docked with the second ground terminal and the voltage input terminal is docked with the first ground terminal, then the devices in the power supply side module and the receiving side module may be damaged.

And, if an accidental short circuit occurs between the voltage output terminal and the first ground terminal of the power supply side module, or an accidental short circuit occurs between the voltage input terminal and the second ground terminal of the receiving side module, leakage and damage may be caused to the circuit module.

In addition, the charging may be performed when the power supply side module is docked with the receiving side module, which may also cause situations of charging unsuitable devices charged and being charged by unsuitable devices or other situations of causing unsafe charging.

SUMMARY

The present invention provides a docking charging circuit and an electronic device, to solve the problem of possible damages on the devices in the power supply side module and the receiving side module caused by reversely connecting the power supply side module with the receiving side module. Further, optional solutions may improve situations such as leakage and damage on the circuit module caused by accidental short circuit; further, optional solutions may improve situations charging unsuitable devices charged and being charged by unsuitable devices or other situations of causing unsafe charging.

According to a first aspect of the present invention, a docking charging circuit is provided, including a power supply side module and a receiving side module that may be docked with each other, the power supply side module comprising a power source, a voltage output terminal connected to the power source and a first ground terminal, the receiving side module including a battery power supply unit, a voltage input terminal connected to the battery power supply unit and a second ground terminal;

the power supply side module further includes a power supply side drive unit, a power generating unit, a first switch unit and a first intermediate terminal, and the receiving side module further includes a second intermediate terminal and a first resistance circuit;

the power generating unit is connected between the first intermediate terminal and the power source, so as to output a target current to the first intermediate terminal under a power supply of the power source; the second intermediate terminal is connected to a first terminal of the first resistance circuit, and a second terminal of the first resistance circuit is grounded together with the second ground terminal;

when the voltage output terminal is docked with the voltage input terminal and the first ground terminal is docked with the second ground terminal, the power generating unit, the first intermediate terminal, the second intermediate terminal, and the first resistance circuit are connected to the ground in sequence to form a first loop;

the first switch unit is connected between the power source and the voltage output terminal, a sampling terminal of the power supply side drive unit is connected to the first intermediate terminal, and an output terminal of the power supply side drive unit is connected to the first switch unit; the power supply side drive unit is configured to control an on-off of the first switch unit according to a voltage of the first intermediate terminal to control the first switch unit to be turned on when the first loop is formed and to control the first switch unit to be turned off under at least a part of a circuit state where the first loop is not formed.

Optionally, the receiving side module further includes a second resistance circuit, the second intermediate terminal is further connected to a first terminal of the second resistance circuit, and a second terminal of the second resistance circuit is connected to the voltage input terminal; the voltage output terminal is docked with the second ground terminal, when the first ground terminal is docked with the voltage input terminal, the power generating unit, the first intermediate terminal, the second intermediate terminal, the second resistance circuit, and the first ground terminal are connected to the ground in sequence to form a second loop;

the at least a part of a circuit state where the first loop is not formed includes at least one of:
a circuit state where the second loop is formed;
a circuit state where the first intermediate terminal does not form a loop to the outside;
a circuit state where at least two of the voltage output terminal, the first intermediate terminal, and the first ground terminal are short-circuited;
a circuit state where at least one of the voltage output terminal, the first intermediate terminal, and the first ground terminal touches a conductor other than the receiving side module;
a circuit state where at least two of the voltage input terminal, the second intermediate terminal, and the second ground terminal are short-circuited;
a circuit state where at least one of the voltage input terminal, the second intermediate terminal, and the second ground terminal touches a conductor other than the receiving side module.

Optionally, the first resistance circuit includes a first resistor, a first terminal of the first resistor is connected to the second intermediate terminal, and a second terminal of the first resistor is grounded together with the second ground terminal;

the second resistance circuit comprises a second resistor and a low forward conduction voltage drop diode, a first terminal of the low forward conduction voltage drop diode is connected to the second intermediate terminal, a second terminal of the low forward conduction voltage drop diode is connected to the voltage input terminal, and the second resistor is connected between the low forward conduction voltage drop diode and the second intermediate terminal or the low forward conduction voltage drop diode and the voltage input terminal.

Optionally, a position of a corresponding contact point of the first intermediate terminal is at a midpoint position between a corresponding contact point of the voltage output terminal and a corresponding contact point of the first ground terminal, and a position of a corresponding contact point of the second intermediate terminal is at a midpoint position between a corresponding contact point of the voltage input terminal and a corresponding contact point of the second ground terminal.

Optionally, the receiving side module further includes a receiving side drive unit and a second switch unit;

the second switch unit is connected between the voltage input terminal and the battery power supply unit, a sampling terminal of the receiving side drive unit is directly or indirectly connected to the voltage input terminal, and an output terminal of the receiving side drive unit is connected to the second switch unit; the receiving side drive unit is configured to compare a voltage of the voltage input terminal with a preset safe voltage interval and control the on-off of the second switch unit according to a comparison result, the preset safe voltage interval being determined according to an overvoltage protection point and a minimum undervoltage protection point of an input voltage.

Optionally, the receiving side module further includes a capacitor, a power supply terminal of the receiving side drive unit is connected to a first terminal of the capacitor, a first terminal of the capacitor is further connected to the second intermediate terminal, and a second terminal of the capacitor is grounded together with the second ground terminal.

Optionally, a communication port of the receiving side drive unit is connected to the second intermediate terminal for receiving an authentication request sent by the power supply side module and returning an authentication pass signal in response to the authentication request, so that the power supply side drive unit of the power supply side module may control the on-off of the first switch unit according to the authentication pass signal.

Optionally, the power supply side module is a circuit module in at least one of the following electronic devices: a mobile phone, a wearable device, a tablet computer, a computer, a smart TV, an image capture device, a charger, and a smart socket.

Optionally, the receiving side module is a circuit module in at least one of the following electronic devices: a mobile phone, a wearable device, a tablet computer, a computer, a smart TV, an image capture device, and an earphone.

According to a second aspect of the present invention, an electronic device is provided, including a power supply side module, the power supply side module including a power source, a voltage output terminal connected to the power source and a first ground terminal, wherein the power supply side module further includes a power supply side drive unit, a power generating unit, a first switch unit and a first intermediate terminal;

the power generating unit is connected between the first intermediate terminal and the power source, so as to employ the first intermediate terminal to output a target current under a power supply of the power source; the first intermediate terminal is configured to be docked with the second intermediate terminal of the receiving side module of other electronic devices, so that when the voltage output terminal is docked with the voltage input terminal of the receiving side module and the first ground terminal is docked with the second ground terminal of the receiving side module, the power generating unit, the first intermediate terminal, the second intermediate terminal, and the first resistance circuit of the receiving side module are connected to the ground in sequence to form a first loop;

the first switch unit is connected between the power source and the voltage output terminal, a sampling terminal of the power supply side drive unit is connected to the first intermediate terminal, and an output terminal of the power supply side drive unit is connected to the first switch unit; the power supply side drive unit is configured to control an on-off of the first switch unit according to a voltage of the first intermediate terminal to control the first switch unit to be turned on when the first loop is formed and to control the first switch unit to be turned off under at least a part of a circuit state where the first loop is not formed.

Optionally, when the voltage output terminal is docked with the second ground terminal and the first ground terminal is docked with the voltage input terminal, the power generating unit, the first intermediate terminal, the second intermediate terminal, the second resistance circuit, and the first ground terminal are connected to the ground in sequence to form a second loop;

the at least a part of a circuit state where the first loop is not formed includes at least one of:

a circuit state where the second loop is formed;

a circuit state where the first intermediate terminal does not form a loop to the outside;

a circuit state where at least two of the voltage output terminal, the first intermediate terminal, and the first ground terminal are short-circuited;

a circuit state where at least one of the voltage output terminal, the first intermediate terminal, and the first ground terminal touches a conductor other than the receiving side module;

a circuit state where at least two of the voltage input terminal, the second intermediate terminal, and the second ground terminal are short-circuited;

a circuit state where at least one of the voltage input terminal, the second intermediate terminal, and the second ground terminal touches a conductor other than the receiving side module.

According to a third aspect of the present invention, an electronic device is provided, including a receiving side module for providing the power supply for the receiving side module of the electronic device involved in the second aspect and the optional solutions thereof, the receiving side module including a battery power supply unit, a voltage input terminal connected to the battery power supply unit, a second ground terminal, and a second intermediate terminal, a first resistance circuit, a receiving side drive unit, and a second switch unit;

the second intermediate terminal is connected to a first terminal of the first resistance circuit, and a second terminal of the first resistance circuit is grounded together with the second ground terminal;

the second intermediate terminal is configured to be docked with the first intermediate terminal to form the first loop when the voltage output terminal is docked with the voltage input terminal and the first ground terminal is docked with the second ground terminal;

the second switch unit is connected between the voltage input terminal and the battery power supply unit, a sampling terminal of the receiving side drive unit is directly or indirectly connected to the voltage input terminal, and an output terminal of the receiving side drive unit is connected to the second switch unit; the receiving side drive unit is configured to compare a voltage of the voltage input terminal with a preset safe voltage interval and control the on-off of the second switch unit according to a comparison result, the preset safe voltage interval being determined according to an overvoltage protection point and a minimum undervoltage protection point of an input voltage.

In the docking charging circuit and the electronic device provided by the present invention, the first loop including the first intermediate terminal, the second intermediate terminal and the first resistance circuit may be formed when the power supply side module is positively connected to the receiving side module, and the first loop may not be formed when the power supply side module is reversely connected to the receiving side module. The present invention may provide a circuit basis for the judgment of positive connection and reverse connection; further, with the combination of the control of the first switch unit by the power supply side drive unit, the first switch unit can be controlled to be turned on when in positive connection to realize power supply, and the first switch unit can be controlled to be turned off when in reverse connection to avoid damage to the devices in the power supply side module and the receiving side module caused by power supply during the reverse connection, so as to functions as judgment for positive and reverse connections and corresponding safety protection.

At the same time, through the control of the first switch unit with the power supply side drive unit, the present invention provides a hardware foundation for external selective power supply, which can help avoid unsafe power supply situations and play a corresponding safety protection role. For example, in an optional solution, if the second loop is formed, the first intermediate terminal does not form a loop to the outside with some ports short-circuited or some ports in contact with other unsuitable external conductors, situations of charging unsuitable receiving side modules or other situations that may cause unsafe conditions are avoided by controlling the first switch unit to turn off.

In an optional solution of the present invention, since a position of a corresponding contact point of the first intermediate terminal is at a midpoint position between a corresponding contact point of the voltage output terminal and a corresponding contact point of the first ground terminal, and a position of a corresponding contact point of the second intermediate terminal is at a midpoint position between a corresponding contact point of the voltage input terminal and a corresponding contact point of the second ground terminal, contact points of the two intermediate terminals may be connected with each other regardless of positive connection or reverse connection.

In an optional solution of the present invention, since the receiving side drive unit is configured to compare a voltage of the voltage input terminal with a preset safe voltage interval and control the on-off of the second switch unit according to a comparison result, the preset safe voltage interval being determined according to an overvoltage protection point and a minimum undervoltage protection point of an input voltage. The preset safe voltage interval may be configured as a reference to determine whether the current input voltage is suitable for charging the battery, so as to avoid the damage to the device caused by charging when the voltage is not suitable for charging and further to improve the safety protection.

In an optional solution of the present invention, since the power supply terminal of the receiving side drive unit is connected to a capacitor that may store energy, the capacitor cannot be charged to the required voltage and furthermore the receiving side drive unit may not perform control under the power of the capacitor if the connected circuit module does not have the first intermediate terminal, so that the charging performed by unsuitable power supply side modules may be avoided, and further unsafe charging that may be caused the above is avoided.

In an optional solution of the present invention, since the communication terminals of the receiving side drive unit may use the second intermediate terminal to interact with each other, a hardware foundation for the command communication mechanism may be offered. Further, since the communication terminals of the receiving side drive unit may use the second intermediate terminal to realize the interaction between the authentication request and the authentication pass signal, the adaptation between the power supply side and the receiving side may be further ensured.

In an optional solution of the present invention, with the combination of the energy storage function of the capacitor and the energy storage function of the communication terminal, the receiving side drive unit may still provide a certain amount of electrical energy to ensure the interaction of interactive commands when the receiving side module is not powered.

BRIEF DESCRIPTION OF THE DRAWINGS

To describe the technical solutions in the embodiments of the present invention or in the prior art more clearly, accompanying drawings required to describe the embodiments or the prior art are briefly described below. It is obvious that the accompanying drawings described below are only some embodiments of the present invention. It is apparent to those of ordinary skill in the art that other drawings may be further obtained based on the accompanying drawings without inventive effort.

DESCRIPTION OF REFERENCE NUMERALS

1—Power supply side module;
11—Power source;
12—Power generating unit;
121—Current source;
13—First switch unit;
14—Power supply side drive unit;
15—Voltage output terminal;
16—First intermediate terminal;
17—First ground terminal;
2—Receiving side module;
21—First resistance circuit;
22—Second resistance circuit;
23—Battery power supply unit;
24—Voltage input terminal;
25—Second intermediate terminal;
26—Second ground terminal;
27—Second switch unit;
28—Receiving side drive unit;
R1—First resistor;
R2—Second resistor;
D1—Low forward conduction voltage drop diode;
D2—Diode;
C1—Capacitor;
FET1—First field effect transistor;
FET2—Second field effect transistor;
FET3—Third field effect transistor.

DETAILED DESCRIPTION OF THE EMBODIMENTS

Clear and intact description will be made on technical schemes in the embodiments of the present invention below in combination with drawings in the embodiments of the present invention. Obviously, the described embodiments are merely a part of embodiments of the present invention and are not all the embodiments. Based on the embodiments of the present invention, all the other embodiments obtained by those of ordinary skill in the art without inventive effort are within the scope of the present invention.

Terms "first", "second", "third", "fourth", and the like (if any) in the specification and claims of the present invention and the foregoing accompanying drawings are used to distinguish similar objects, but do not need to be used for describing a specific sequence or an order. It should be understood that data used in this way can be interchanged under appropriate circumstances, so that the embodiments of the present invention described herein can be implemented in an order other than those illustrated or described herein. In addition, terms "including", "having", and any variations thereof are intended to cover non-exclusive inclusions, for example, processes, methods, systems, products, or devices that contain a series of steps or units need not be limited to those clearly listed steps or units, but may include other steps or units not explicitly listed or inherent to these processes, methods, products, or devices.

The technical solutions of the present invention are described in detail below with reference to the specific embodiments. The following several embodiments may be combined with each other, and a same or similar concept or process may not be described again in some embodiments.

Figure 1:
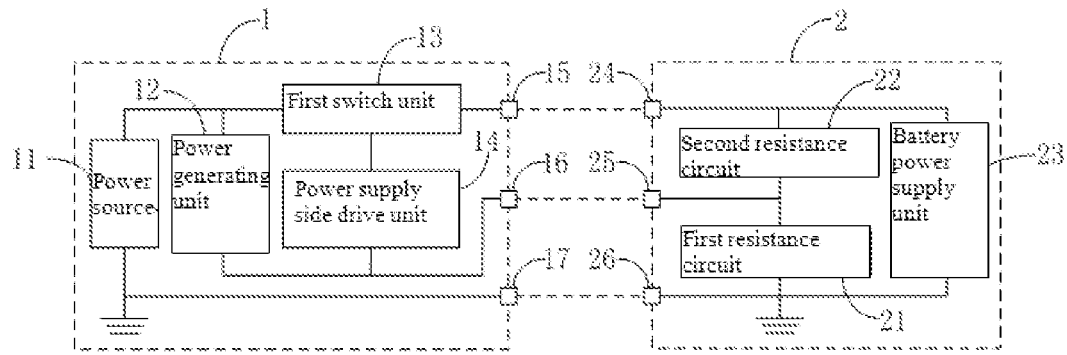
FIG. 1 is a circuit diagram one showing when a docking charging circuit is positively connected in an embodiment of the present invention.
Figure 2:
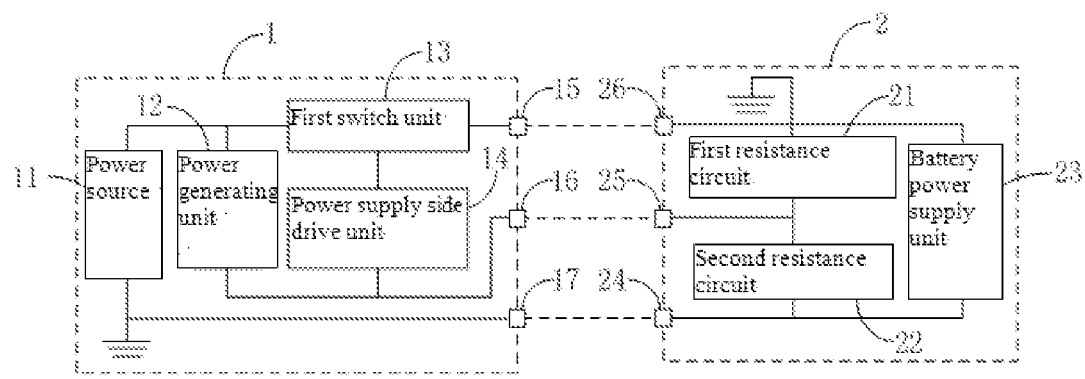
FIG. 2 is a circuit diagram showing when a docking charging circuit is reversely connected in an embodiment of the present invention.

FIG. 1 is a circuit diagram one showing when a docking charging circuit is positively connected in an embodiment of the present invention; FIG. 2 is a circuit diagram showing when a docking charging circuit is reversely connected in an embodiment of the present invention.

With reference to FIGS. 1 and 2, a docking charging circuit includes a power supply side module 1 and a receiving side module 2 that may be docked with each other, the power supply side module 1 including a power source 11, a voltage output terminal 15 connected to the power source 11 and a first ground terminal 17, the receiving side module 2 including a battery power supply unit 23, a voltage input terminal 24 connected to the battery power supply unit 23 and a second ground terminal 26.

By docking the voltage output terminal 15 with the voltage input terminal 24 and the first ground terminal 17 with the second ground terminal 26, the power supply from the power source may be supplied to the battery power supply unit 23 to charge the battery power supply unit 23 in the case that both are turned on.

The voltage output by the voltage output terminal 15 may be characterized as Vout, the voltage input by the voltage input terminal 24 may be characterized as Vin, and the voltage across the power source may be characterized as V1 with the corresponding voltage output to the voltage output terminal 15 and the power generating unit 12 characterized as Vee.

The battery power supply unit 23 may be characterized as Battery-Powered System, which is a circuit unit that may be connected to the battery, and then may supply electric energy to and charge the battery, e.g., a circuit unit that may realize linear charging, switch charging, etc.; the battery power supply unit 23 in any manner may be understood as an implementation of the solution involved in the present embodiment.

The power supply side module 1 may be characterized as SourceSide, i.e., a source terminal; the receiving side module 2 may be characterized as SinkSide, i.e., the receiving terminal. For electronic devices that may only be configured with the power supply side module 1 to provide power for charging other electronic devices, and the electronic device may also be configured with only the receiving side module 2 to be powered by other electronic devices, so that the charging may be achieved; and also, the electronic device may be configured with the power supply side module 1 and the receiving side module 2 at the same time, so as to supply power for charging another electronic device and to be charged by another electronic device.

According to the function, the power supply side drive unit 14 may be characterized as IdentifyingIndicatingGateDriving in an example.

In the present embodiment, the power supply side module 1 further includes a power supply side drive unit 14, a power generating unit 12, a first switch unit 13 and a first intermediate terminal 16, and the receiving side module 2 further includes a second intermediate terminal 25 and a first resistance circuit 21.

The power generating unit 12 is connected between the first intermediate terminal 16 and the power source 12 to output a target current to the first intermediate terminal 16 under the power supply of the power source 11; therefore, in an example, the power generating unit 12 may include a current source 121, and in another example include a voltage dividing unit, which may be realized, for example, by dividing voltage by a resistor. It can be seen that the target current may be a fixed current value or a variable current value.

The second intermediate terminal 25 is connected to a first terminal of the first resistance circuit 21, and a second terminal of the first resistance circuit 21 is grounded together with the second ground terminal 26.

When the voltage output terminal 15 is docked with the voltage input terminal 24 and the first ground terminal 15 is docked with the second ground terminal 26, the power generating unit 12, the first intermediate terminal 16, the second intermediate terminal 25, and the first resistance circuit 22 are connected to the ground in sequence to form a first loop, as shown in FIG. 1.

The first switch unit 13 is connected between the power source 11 and the voltage output terminal 15, a sampling terminal of the power supply side drive unit 14 is connected to the first intermediate terminal 16, and an output terminal of the power supply side drive unit 14 is connected to the first switch unit 13; the power supply side drive unit 14 is configured to control an on-off of the first switch unit 13 according to a voltage of the first intermediate terminal 16 to control the first switch unit 13 to be turned on when the first loop is formed and to control the first switch unit 13 to be turned off under at least a part of a circuit state where the first loop is not formed.

After the first loop is formed, under the power supply of the target current, a theoretical voltage of the first intermediate terminal 16 should be a first voltage value. The first voltage value may be determined according to a voltage drop value and/or a resistance value of the first resistance circuit 21, the current value of the target current, and a voltage value such as Vee output from the power source.

In an embodiment, if the target current is the fixed current value and the first voltage value is the voltage value when the first loop is formed, when the first loop is not formed, the voltage of the first intermediate terminal 16 will be different from the first voltage value, whether the first loop is currently formed may be judged by judging whether the collected voltage value of the first intermediate terminal 16 is the first voltage value or judging whether the difference between the collected voltage value of the first intermediate terminal 16 and the first voltage value is less than a threshold; for example, if the voltage value of the first intermediate terminal 16 is the first voltage value or the difference between the voltage value of the first intermediate terminal 16 and the first voltage value is less than the threshold, it is determined that the first loop is formed.

In actual implementation, when the first resistance circuit 21 may provide a resistance of 5.1 K Ω and the current value of the target current is fixed at 330 μA, the first voltage value may be 1.68V.

In another embodiment, if the target current is the fixed current value, when the first loop is not formed, the voltage of the first intermediate terminal 16 will be a second voltage value different from the first voltage value, whether the current state is other circuit states other than the first loop may also be judged by judging whether the collected voltage value of the first intermediate terminal 16 is the second voltage value or judging whether the difference between the collected voltage value of the first intermediate terminal 16 and the second voltage value is less than the threshold; if yes, it is inferred that the first loop is not formed currently. For example, if the voltage value of the first intermediate terminal 16 is the second voltage value, or the difference between the voltage value of the first intermediate terminal 16 and the first voltage value is less than the threshold, it is determined that the first loop is not formed.

In actual implementation, if the first voltage value is 1.68V and a forward voltage of the low forward voltage drop diode in the second resistance circuit 22 in the second loop referred to later is 0.2V while the second resistance circuit 22 providing a resistance of 100Ω, the second voltage value may be, for example, 0.233V, which is the theoretical voltage of the first intermediate terminal 16 when the second loop is formed. In optional embodiments, other second voltage values may also be designed for at least the occurrence of a short circuit, connecting an external conductor, etc., and furthermore, whether the first loop is formed may be determined by referring to logic. According to the different situations under consideration, the specific implementation logic may be diverse.

In addition, the first voltage value and the second voltage value may also be combined to realize the judgment.

It can be seen that the judgment of whether to form the first loop may be a direct judgment or an indirect judgment.

In a further embodiment, regardless of whether the target current is the fixed current value or the variable current value, whether the first loop is formed may be determined according to the change of the voltage value of the first intermediate terminal 16. For example, when the target current is the fixed current value, whether the first loop is formed may be determined by determining whether the voltage value of the first intermediate terminal 16 has changed from the first voltage value to the second voltage value and/or whether the voltage value has changed from the second voltage value to the first voltage value; in a specific example, which circuit state is formed may be determined when the first loop is not formed.

The judgment logic may determine an interval that may be beneficial to characterize the normal range of the voltage value of the first intermediate terminal 16 in the first loop by setting the parameter values of the corresponding circuit elements and then calculating the circuit principle. If the voltage value falls in the interval, it can be determined that the first loop is formed.

In the above embodiments, since the first loop including the first intermediate terminal, the second intermediate terminal and the first resistance circuit may be formed when the power supply side module is positively connected to the receiving side module, and the first loop may not be formed when the power supply side module is reversely connected to the receiving side module, the present invention may provide a circuit basis for the judgment of positive connection and reverse connection; further, with the combination of the control of the first switch unit by the power supply side drive unit, the first switch unit can be controlled to be turned on when in positive connection to realize power supply, and the first switch unit can be controlled to be turned off when in reverse connection to avoid damage to the devices in the power supply side module and the receiving side module caused by power supply during the reverse connection, so as to functions as judgment for positive and reverse connections and corresponding safety protection.

At the same time, through the control of the first switch unit with the power supply side drive unit, the above embodiments provide a hardware foundation for external selective power supply, which can help avoid unsafe power supply situations and play a corresponding safety protection role. For example, in an optional solution, if the second loop is formed, the first intermediate terminal does not form a loop to the outside with some ports short-circuited or some ports in contact with other unsuitable external conductors, situations of charging unsuitable receiving side modules or other situations that may cause unsafe conditions are avoided by controlling the first switch unit to turn off.

In an embodiment, with reference to FIGS. 1 and 2, the receiving side module 2 further includes a second resistance circuit 22, the second intermediate terminal 25 is further connected to a first terminal of the second resistance circuit 22, and a second terminal of the second resistance circuit 22 is connected to the voltage input terminal 24; when the voltage output terminal 15 is docked with the second ground terminal 26 and the first ground terminal 17 is docked with the voltage input terminal 24, the power generating unit 12, the first intermediate terminal 16, the second intermediate terminal 25, the second resistance circuit 22, the voltage input terminal 24 and the first ground terminal 17 are connected to the ground in sequence to form a second loop.

Therefore, the at least a part of a circuit state where the first loop is not formed may include a circuit state where the second loop is formed. It can be seen that when the power supply side module 1 is positively connected to the receiving side module 2, as shown in FIG. 1, the first loop may be formed, and when the power supply side module 1 is reversely connected to the receiving side module 2, as shown in FIG. 2, the second loop may be formed.

When the second loop is formed, in other words, a reverse connection has occurred, then the power supply side drive unit 14 may turn off the first switch unit 13.

In actual implementation, the power supply side drive unit 14 may also be connected to an alarm assembly to form the second loop, i.e., controlling the alarm assembly to alarm when the reverse connection occurs, wherein the alarm assembly may, for example, include a light emitting diode for alarm indication, and the way of the controller to alarm may be, for example, controlling the light emitting diode to emit light or controlling the light emitting diode to blink.

In an embodiment, the at least a part of a circuit state where the first loop is not formed may include a circuit state where the first intermediate terminal 16 does not form a loop to the outside, which may understood as a circuit state when the first intermediate terminal 16 is connected to nothing outside.

Further, when the first intermediate terminal 16 is connected to nothing outside, the power supply side drive unit 14 may control the first switch unit 13 to turn off, which may prevent the voltage output terminal 15 from outputting electricity to the outside and causing leakage, and further improve safety.

In an embodiment, the at least a part of a circuit state where the first loop is not formed may include a circuit state where at least two of the voltage output terminal 15, the first intermediate terminal 16, and the first ground terminal 17 are short-circuited. The at least a part of a circuit state where the first loop is not formed may include a circuit state where at least two of the voltage input terminal 24, the second intermediate terminal 25, and the second ground terminal 26 are short-circuited.

Further, when the port is short-circuited, the first switch unit 13 may be turned off in time to avoid overcurrent damage caused by excessive current, which further improves safety.

In an embodiment, the at least a part of a circuit state where the first loop is not formed may include: a circuit state where at least one of the voltage output terminal 15, the first intermediate terminal 16, and the first ground terminal 17 touches a conductor other than the receiving side module; the at least a part of a circuit state where the first loop is not formed may include: a circuit state where at least one of the voltage input terminal 24, the second intermediate terminal 25, and the second ground terminal 26 touches a conductor other than the receiving side module 1.

Further, when the port touches other conductors externally, the first switch unit 13 may be turned off in time to avoid overcurrent damage caused by excessive current, which further improves safety.

In an embodiment, a position of a corresponding contact point of the first intermediate terminal 16 is at a midpoint position between a corresponding contact point of the voltage output terminal 15 and a corresponding contact point of the first ground terminal 17, and a position of a corresponding contact point of the second intermediate terminal 25 is at a midpoint position between a corresponding contact point of the voltage input terminal 24 and a corresponding contact point of the second ground terminal 26.

A distance between the corresponding contact point of the voltage output terminal 15 and the corresponding contact point of the first ground terminal 17 is usually the same as a distance between the corresponding contact point of the voltage input terminal 24 and the corresponding contact point of the second ground terminal 26.

If the contact point is a metal contact point in the interface, the contact point that meets the requirements of the above position may be selected as the contact point at the middle terminal; if the contact point is not a contact point in the interface, the contact position of the middle terminal may be configured in the hardware design of the contact point to meet the above position requirements.

Figure 3:
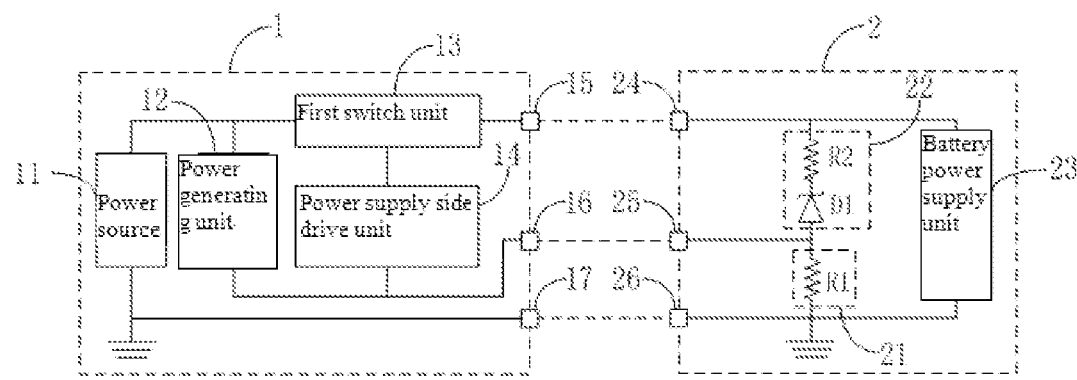
FIG. 3 is a circuit diagram two showing when a docking charging circuit is positively connected in an embodiment of the present invention.

FIG. 3 is a circuit diagram two showing when a docking charging circuit is positively connected in an embodiment of the present invention.

With reference to FIG. 3, the first resistance circuit 21 includes a first resistor R1, a first terminal of the first resistor R1 is connected to the second intermediate terminal 25, and a second terminal of the first resistor R1 is grounded together with the second ground terminal 26.

The second resistance circuit 22 includes a second resistor R2 and a low forward conduction voltage drop diode D1, a first terminal of the low forward conduction voltage drop diode D1 is connected to the second intermediate terminal 25, a second terminal of the low forward conduction voltage drop diode D1 is connected to the voltage input terminal 24, and the second resistor R2 is connected between the low forward conduction voltage drop diode D1 and the second intermediate terminal 25 or the low forward conduction voltage drop diode D1 and the voltage input terminal 24.

In actual implementation, other resistors may be connected in series or in parallel in the first resistance circuit 21 and the second resistance circuit 22.

Figure 4:
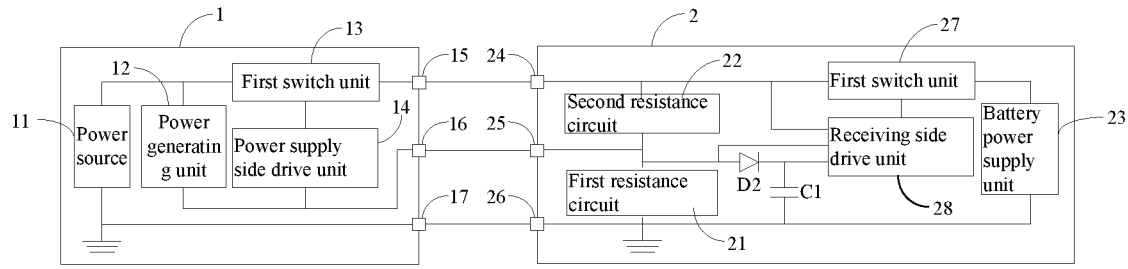
FIG. 4 is a circuit diagram three showing when a docking charging circuit is positively connected in an embodiment of the present invention.

FIG. 4 is a circuit diagram three showing when a docking charging circuit is positively connected in an embodiment of the present invention.

With reference to FIG. 4, the receiving side module 2 further includes a receiving side drive unit 28 and a second switch unit 27.

The second switch unit 27 is connected between the voltage input terminal 24 and the battery power supply unit 23, a sampling terminal of the receiving side drive unit 28 is directly or indirectly connected to the voltage input terminal 24, and an output terminal of the receiving side drive unit 28 is connected to the second switch unit 27; the receiving side drive unit 28 is configured to compare a voltage of the voltage input terminal with a preset safe voltage interval and control the on-off of the second switch unit 27 according to a comparison result, the preset safe voltage interval being determined according to an overvoltage protection point and a minimum undervoltage protection point of an input voltage; specifically, for example, the preset safe voltage interval has a lower limit being a lowest undervoltage protection point and a upper limit being the overvoltage protection point.

The receiving side drive unit 28 may produce a protective effect, and therefore, according to the function, it may be characterized as ProtectionGateDriving or GateDrivingProtection.

In the above embodiment, since the receiving side drive unit is configured to compare a voltage of the voltage input terminal with a preset safe voltage interval and control the on-off of the second switch unit according to a comparison result, the preset safe voltage interval being determined according to an overvoltage protection point and a minimum undervoltage protection point of an input voltage. The preset safe voltage interval may be configured as a reference to determine whether the current input voltage is suitable for charging the battery, so as to avoid the damage to the device caused by charging when the voltage is not suitable for charging and further to improve the safety protection.

In an embodiment, with reference to FIG. 4, the receiving side module 2 further includes a capacitor C1, a power supply terminal of the receiving side drive unit 28 is connected to a first terminal of the capacitor C1, a first terminal of the capacitor C1 is further connected to the second intermediate terminal 25, and a second terminal of the capacitor C1 is grounded together with the second ground terminal 26.

Since the power supply terminal of the receiving side drive unit is connected to a capacitor that may store energy, the capacitor cannot be charged to the required voltage and furthermore the receiving side drive unit may not perform control under the power of the capacitor if the connected circuit module does not have the first intermediate terminal, so that the charging performed by unsuitable power supply side modules may be avoided, and further unsafe charging that may be caused the above is avoided.

In an embodiment, with reference to FIG. 4, a communication port of the receiving side drive unit 28 is connected to the second intermediate terminal 25 so as to interact with the power supply side module 1 through the second intermediate terminal 25.

The communication port may be characterized as an input and output port, i.e., an I/O port.

Since the communication terminal of the receiving side drive unit may use the second intermediate terminal to interact, it provides a hardware foundation for the command communication mechanism; for example, realizing the interaction of commands when not used for power supply may provide a basis for further complex and diverse control possibilities, and may further provide a basis for further safety certification.

The receiving side drive unit 28 may specifically be configured to receive an authentication request sent by the power supply drive unit 14 of the power supply side module 1 or other circuit units, and return an authentication pass signal in response to the authentication request, so that the power supply side drive unit 14 of the power supply side module 1 may control the on-off of the first switch unit according to the authentication pass signal.

Since the communication terminals of the receiving side drive unit may use the second intermediate terminal to realize the interaction between the authentication request and the authentication pass signal, the adaptation between the power supply side and the receiving side may be further ensured.

In the embodiment shown in FIG. 4, with the combination of the energy storage function of the capacitor and the energy storage function of the communication terminal, the receiving side drive unit may still provide a certain amount of electrical energy to ensure the interaction of interactive commands when the receiving side module is not powered.

In actual implementation, if the power supply side module 1 supplying power to the receiving side module 2 requires higher safety certification requirements, the power supply side drive unit 14 of the power supply side module 1 or other circuit units may be configured to be able to send corresponding logic level commands through the first intermediate terminal 16 and the second intermediate terminal 25, which may be understood as a certification requirement. The receiving side drive unit 25 may recognize the logic level command through the communication port and respond, for example, feedback the authentication pass signal, and the power supply side drive unit 14 may further determine whether it is necessary to keep the first switch unit 13 turned on according to the received signal, for example, controlling the first switch unit 13 to turn on if the certification pass signal is received.

Based on the above functions, the receiving side drive unit 25 may be specifically characterized as ProtectionRespondGateDriving.

Figure 5:
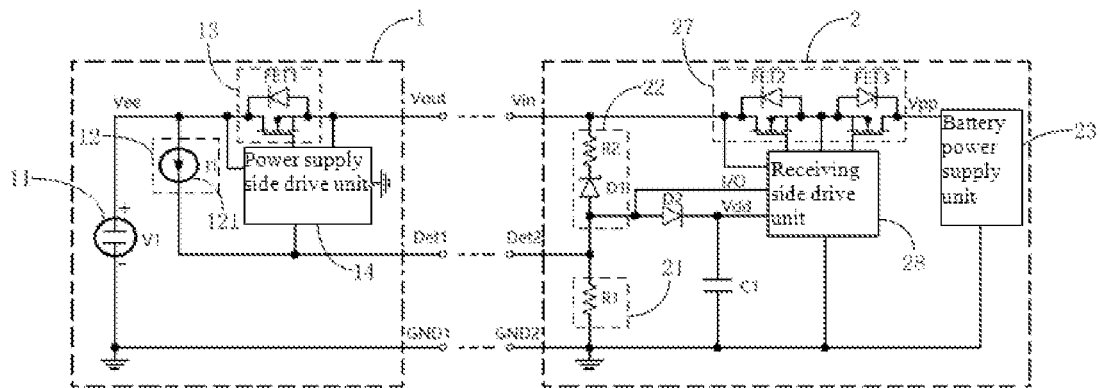
FIG. 5 is a circuit diagram four showing when a docking charging circuit is positively connected in an embodiment of the present invention.

FIG. 5 is a circuit diagram four showing when a docking charging circuit is positively connected in an embodiment of the present invention.

With reference to FIG. 5, Det1 may be used to characterize the first intermediate terminal 16, Det2 to characterize the second intermediate terminal 25, GND1 to characterize the first ground terminal 17, and GND2 to characterize the second ground terminal 26.

The first switch unit 13 may include a first field effect transistor FET1, which may be an N-channel field effect transistor with a source connected to the voltage output terminal 15, a drainage connected to the power source 11 and a gate connected to the power supply side drive unit 14.

The second switch unit 27 may include a second field effect transistor FET2, which may be an N-channel field effect transistor with a source connected to the battery power supply unit 23, a drainage connected to the voltage input terminal 24 and a gate connected to the receiving side drive unit 28.

In a specific embodiment, the second switch unit 27 may further include a third field effect transistor FET3, which may be an N-channel field effect transistor with a source connected to the voltage input terminal 24, a drainage connected to the battery power supply unit 23 and a gate connected to the receiving side drive unit 28. The third field effect transistor FET3 may prevent leakage of an internal power source of the receiving terminal to the voltage input terminal 24.

In another embodiment, the receiving side drive unit 28 may be configured with a circuit for placing leakage; therefore, the third field effect transistor FET3 may not be provided.

Figure 6:
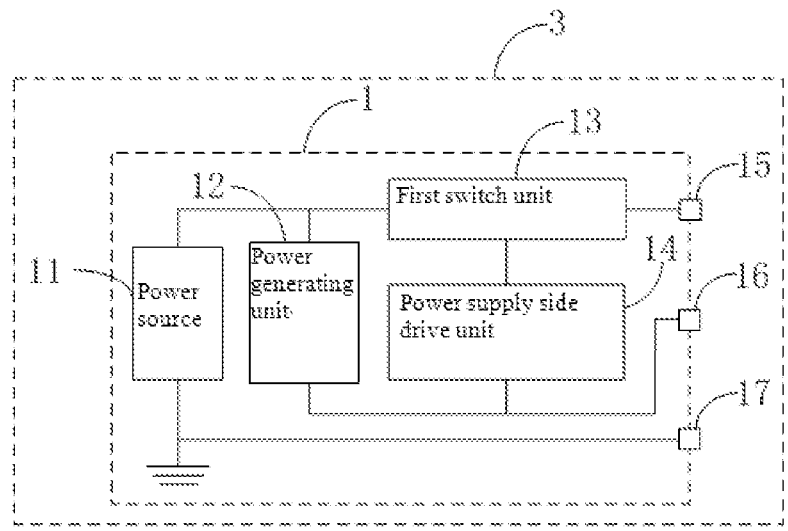
FIG. 6 is a circuit diagram of an electronic device including a power supply side module in an embodiment of the present invention.

FIG. 6 is a circuit diagram of an electronic device including a power supply side module in an embodiment of the present invention.

With reference to FIG. 6, an electronic device 3 of the power supply side module 1 is included, including the power supply side module 1, which may be understood with reference to the embodiments shown in FIGS. 1 to 5, and specifically may be understood as the power supply side module 1 of the docking charging circuit.

Therefore, the power supply side module 1 includes a power source 11, a voltage output terminal 15 connected to the power source 11 and a first ground terminal 17, wherein the power supply side module 1 further includes a power supply side drive unit 14, a power generating unit 12, a first switch unit 13 and a first intermediate terminal 16.

The power generating unit 12 is connected between the first intermediate terminal 15 and the power source 11, so as to employ the first intermediate terminal 16 to output a target current under a power supply of the power source 11; the first intermediate terminal 16 is configured to be docked with the second intermediate terminal of the receiving side module of other electronic devices, so that when the voltage output terminal 16 is docked with the voltage input terminal of the receiving side module, and the first ground terminal 17 is docked with the second ground terminal of the receiving side module, the power generating unit 12, the first intermediate terminal 16, the second intermediate terminal, and the first resistance circuit of the receiving side module are connected to the ground in sequence to form a first loop.

The first switch unit 13 is connected between the power source 11 and the voltage output terminal 15, a sampling terminal of the power supply side drive unit 14 is connected to the first intermediate terminal 16, and an output terminal of the power supply side drive unit 14 is connected to the first switch unit 13; the power supply side drive unit 14 is configured to control an on-off of the first switch unit 13 according to a voltage of the first intermediate terminal 16 to control the first switch unit 13 to be turned on when the first loop is formed and to control the first switch unit 13 to be turned off under at least a part of a circuit state where the first loop is not formed.

Optionally, when the voltage output terminal is docked with the second ground terminal and the first ground terminal is docked with the voltage input terminal, the power generating unit, the first intermediate terminal, the second intermediate terminal, the second resistance circuit, and the first ground terminal are connected to the ground in sequence to form a second loop;

the at least a part of a circuit state where the first loop is not formed includes at least one of:

a circuit state where the second loop is formed;

a circuit state where the first intermediate terminal does not form a loop to the outside;

a circuit state where at least two of the voltage output terminal, the first intermediate terminal, and the first ground terminal are short-circuited;

a circuit state where at least one of the voltage output terminal, the first intermediate terminal, and the first ground terminal touches a conductor other than the receiving side module;

a circuit state where at least two of the voltage input terminal, the second intermediate terminal, and the second ground terminal are short-circuited;

a circuit state where at least one of the voltage input terminal, the second intermediate terminal, and the second ground terminal touches a conductor other than the receiving side module.

Moreover, any description of all the embodiments shown in FIGS. 1 to 5 may be applied to the embodiment shown in FIG. 6; therefore, other repeated technical features and technical effects will not be repeated here.

In a specific embodiment, the power supply side module 1 may be a circuit module in at least one of the following electronic devices: a mobile phone, a wearable device, a tablet computer, a computer, a smart TV, an image capture device, a charger, and a smart socket. The electronic device 3 may be any one of the above.

Figure 7:
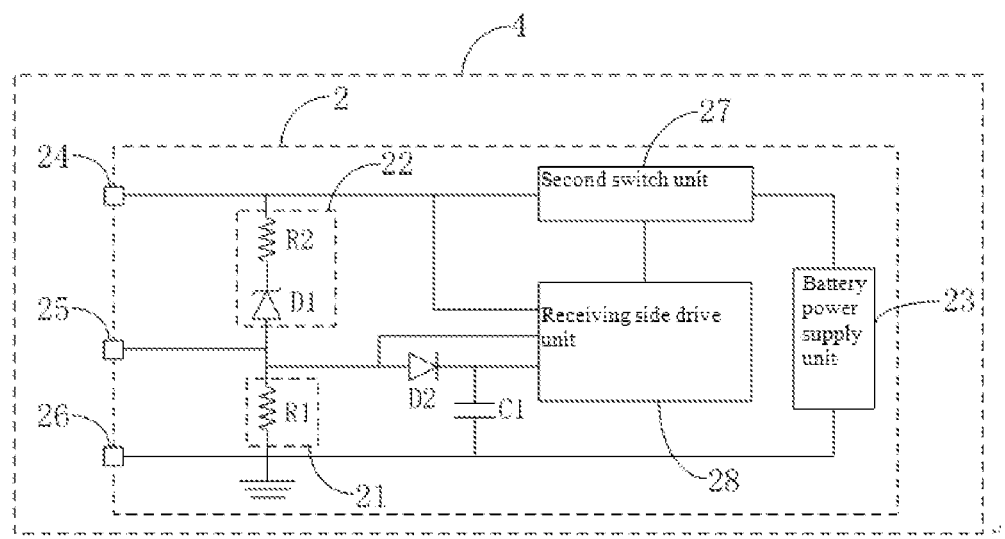
FIG. 7 is a circuit diagram one of an electronic device including a receiving side module in an embodiment of the present invention.

FIG. 7 is a circuit diagram of an electronic device including a receiving side module in an embodiment of the present invention.

With reference to FIG. 7, an electronic device 4 including the receiving side module is provided, including a receiving side module 2 for providing the power supply for the receiving side module 1 of the electronic device involved above, the receiving side module 2 including a battery power supply unit 23, a voltage input terminal 24 connected to the battery power supply unit 23, a second ground terminal 26, and a second intermediate terminal 25, a first resistance circuit 21, a receiving side drive unit 25, and a second switch unit 24.

The second intermediate terminal 25 is connected to a first terminal of the first resistance circuit 21, and a second terminal of the first resistance circuit 21 is grounded together with the second ground terminal 26.

The second intermediate terminal 25 is configured to be docked with the first intermediate terminal 16 to form the first loop when the voltage output terminal 15 is docked with the voltage input terminal 24 and the first ground terminal 17 is docked with the second ground terminal 26.

The second switch unit 27 is connected between the voltage input terminal 2 and the battery power supply unit 23, a sampling terminal of the receiving side drive unit 28 is directly or indirectly connected to the voltage input terminal 24, and an output terminal of the receiving side drive unit 28 is connected to the second switch unit 27; the receiving side drive unit 28 is configured to compare a voltage of the voltage input terminal with a preset safe voltage interval and control the on-off of the second switch unit according to a comparison result, the preset safe voltage interval being determined according to an overvoltage protection point and a minimum undervoltage protection point of an input voltage.

Moreover, any description of all the embodiments shown in FIGS. 1 to 5 may be applied to the embodiment shown in FIG. 7; therefore, other repeated technical features and technical effects will not be repeated here.

In a specific embodiment, the receiving side module 2 may be a circuit module in at least one of the following electronic devices: a mobile phone, a wearable device, a tablet computer, a computer, a smart TV, an image capture device, and an earphone. The electronic device 4 may be any one of the above.

In summary, in the docking charging circuit and the electronic device provided by the present invention, the first loop including the first intermediate terminal, the second intermediate terminal and the first resistance circuit may be formed when the power supply side module is positively connected to the receiving side module, and the first loop may not be formed when the power supply side module is reversely connected to the receiving side module. The present invention may provide a circuit basis for the judgment of positive connection and reverse connection; further, with the combination of the control of the first switch unit by the power supply side drive unit, the first switch unit can be controlled to be turned on when in positive connection to realize power supply, and the first switch unit can be controlled to be turned off when in reverse connection to avoid damage to the devices in the power supply side module and the receiving side module caused by power supply during the reverse connection, so as to functions as judgment for positive and reverse connections and corresponding safety protection.

At the same time, through the control of the first switch unit with the power supply side drive unit, the present invention provides a hardware foundation for external selective power supply, which can help avoid unsafe power supply situations and play a corresponding safety protection role. For example, in an optional solution, if the second loop is formed, the first intermediate does not form a loop to the outside with some ports short-circuited or some ports in contact with other unsuitable external conductors, situations of charging unsuitable receiving side modules or other situations that may cause unsafe conditions are avoided by controlling the first switch unit to turn off.

In the last, it should be noted that the above embodiments are only used to illustrate the technical solutions of the present invention, not to limit them; although the present invention has been described in detail with reference to the foregoing embodiments, those of ordinary skill in the art should understand that they can still modify the technical solutions described in the foregoing embodiments, or equivalently replace some or all of the technical features; these modifications or replacements do not cause the essence of the corresponding technical solutions to deviate from the scope of the technical solutions of the embodiments of the present invention.

What is claimed is:

1. A docking charging circuit, comprising a power supply side module and a receiving side module that may be docked with each other, the power supply side module comprising a power source, a voltage output terminal connected to the power source and a first ground terminal, the receiving side module comprising a battery power supply unit and a voltage input terminal connected to the battery power supply unit;

wherein the power supply side module further comprises a power supply side drive unit, a power generating unit, a first switch unit and a first intermediate terminal, and the receiving side module further comprises a second intermediate terminal, a second ground terminal, a first resistance circuit and a second resistance circuit;

the power generating unit is connected between the first intermediate terminal and the power source, so as to output a target current to the first intermediate terminal under a power supply of the power source; the second intermediate terminal is connected to a first terminal of the first resistance circuit, and a second terminal of the first resistance circuit is grounded together with the second ground terminal;

when the voltage output terminal is docked with the voltage input terminal and the first ground terminal is docked with the second ground terminal, the power generating unit, the first intermediate terminal, the second intermediate terminal, and the first resistance circuit are connected to the ground in sequence to form a first loop; and the first switch unit is connected between the power source and the voltage output terminal, a sampling terminal of the power supply side drive unit is connected to the first intermediate terminal, and an output terminal of the power supply side drive unit is connected to the first switch unit; the power supply side drive unit is configured to control an on-off of the first switch unit according to a voltage of the first intermediate terminal to control the first switch unit to be turned on when the first loop is formed and to control the first switch unit to be turned off under at least a part of a circuit state where the first loop is not formed, wherein the receiving side module further comprises a second resistance circuit, the second intermediate terminal is further connected to a first terminal of the second resistance circuit, and a second terminal of the second resistance circuit is connected to the voltage input terminal; the voltage output terminal is docked with the second ground terminal, and when the first ground terminal is docked with the voltage input terminal, the power generating unit, the first intermediate terminal, the second intermediate terminal, the second resistance circuit, and the first ground terminal are connected to the ground in sequence to form a second loop;

the at least a part of a circuit state where the first loop is not formed comprises at least one of:
a circuit state where the second loop is formed;
a circuit state where the first intermediate terminal does not form a loop to the outside;
a circuit state where at least two of the voltage output terminal, the first intermediate terminal, and the first ground terminal are short-circuited;
a circuit state where at least one of the voltage output terminal, the first intermediate terminal, and the first ground terminal touches a conductor other than the receiving side module;
a circuit state where at least two of the voltage input terminal, the second intermediate terminal, and the second ground terminal are short-circuited; and
a circuit state where at least one of the voltage input terminal, the second intermediate terminal, and the second ground terminal touches a conductor other than the receiving side module.

2. The docking charging circuit according to claim 1, wherein the first resistance circuit comprises a first resistor, a first terminal of the first resistor is connected to the second intermediate terminal, and a second terminal of the first resistor is grounded together with the second ground terminal; and the second resistance circuit comprises a second resistor and a low forward conduction voltage drop diode, a first terminal of the low forward conduction voltage drop diode is connected to the second intermediate terminal, a second terminal of the low forward conduction voltage drop diode is connected to the voltage input terminal, and the second resistor is connected between the low forward conduction voltage drop diode and the second intermediate terminal or between the low forward conduction voltage drop diode and the voltage input terminal.

3. The docking charging circuit according to claim 2, wherein a position of a corresponding contact point of the first intermediate terminal is at a midpoint position between a corresponding contact point of the voltage output terminal and a corresponding contact point of the first ground terminal, and a position of a corresponding contact point of the second intermediate terminal is at a midpoint position between a corresponding contact point of the voltage input terminal and a corresponding contact point of the second ground terminal.

4. The docking charging circuit according to claim 2, wherein a position of a corresponding contact point of the first intermediate terminal is at a midpoint position between a corresponding contact point of the voltage output terminal and a corresponding contact point of the first ground terminal, and a position of a corresponding contact point of the second intermediate terminal is at a midpoint position between a corresponding contact point of the voltage input terminal and a corresponding contact point of the second ground terminal.

5. The docking charging circuit according to claim 2, wherein the receiving side module further comprises a receiving side drive unit and a second switch unit;

the second switch unit is connected between the voltage input terminal and the battery power supply unit, a sampling terminal of the receiving side drive unit is directly or indirectly connected to the voltage input terminal, and an output terminal of the receiving side drive unit is connected to the second switch unit; the receiving side drive unit is configured to compare a voltage of the voltage input terminal with a preset safe voltage interval and control the on-off of the second switch unit according to a comparison result, the preset safe voltage interval being determined according to an overvoltage protection point and a minimum undervoltage protection point of an input voltage.

6. The docking charging circuit according to claim 5, wherein the receiving side module further comprises a capacitor, a power supply terminal of the receiving side drive unit is connected to a first terminal of the capacitor, the first terminal of the capacitor is further connected to the second intermediate terminal, and a second terminal of the capacitor is grounded together with the second ground terminal.

7. The docking charging circuit according to claim 5, wherein a communication port of the receiving side drive unit is connected to the second intermediate terminal for receiving an authentication request sent by the power supply side module and returning an authentication pass signal in response to the authentication request, so that the power supply side drive unit of the power supply side module may control the on-off of the first switch unit according to the authentication pass signal.

8. The docking charging circuit according to claim 2, wherein the receiving side module further comprises a receiving side drive unit and a second switch unit;

the second switch unit is connected between the voltage input terminal and the battery power supply unit, a sampling terminal of the receiving side drive unit is directly or indirectly connected to the voltage input terminal, and an output terminal of the receiving side drive unit is connected to the second switch unit; the receiving side drive unit is configured to compare a voltage of the voltage input terminal with a preset safe voltage interval and control the on-off of the second switch unit according to a comparison result, the preset safe voltage interval being determined according to an overvoltage protection point and a minimum undervoltage protection point of an input voltage.

9. The docking charging circuit according to claim 8, wherein the receiving side module further comprises a capacitor, a power supply terminal of the receiving side drive unit is connected to a first terminal of the capacitor, the first terminal of the capacitor is further connected to the second intermediate terminal, and a second terminal of the capacitor is grounded together with the second ground terminal.

10. The docking charging circuit according to claim 8, wherein a communication port of the receiving side drive unit is connected to the second intermediate terminal for receiving an authentication request sent by the power supply side module and returning an authentication pass signal in response to the authentication request, so that the power supply side drive unit of the power supply side module may control the on-off of the first switch unit according to the authentication pass signal.

11. The docking charging circuit according to claim 1, wherein a position of a corresponding contact point of the first intermediate terminal is at a midpoint position between a corresponding contact point of the voltage output terminal and a corresponding contact point of the first ground terminal, and a position of a corresponding contact point of the second intermediate terminal is at a midpoint position between a corresponding contact point of the voltage input terminal and a corresponding contact point of the second ground terminal.

12. The docking charging circuit according to claim 1, wherein the receiving side module further comprises a receiving side drive unit and a second switch unit;

the second switch unit is connected between the voltage input terminal and the battery power supply unit, a sampling terminal of the receiving side drive unit is directly or indirectly connected to the voltage input terminal, and an output terminal of the receiving side drive unit is connected to the second switch unit; the receiving side drive unit is configured to compare a voltage of the voltage input terminal with a preset safe voltage interval and control the on-off of the second switch unit according to a comparison result, the safe voltage interval being determined according to an overvoltage protection point and a minimum undervoltage protection point of an input voltage.

13. The docking charging circuit according to claim 12, wherein the receiving side module further comprises a capacitor, a power supply terminal of the receiving side drive unit is connected to a first terminal of the capacitor, the first terminal of the capacitor is further connected to the second intermediate terminal, and a second terminal of the capacitor is grounded together with the second ground terminal.

14. The docking charging circuit according to claim 12, wherein a communication port of the receiving side drive unit is connected to the second intermediate terminal for receiving an authentication request sent by the power supply side module and returning an authentication pass signal in response to the authentication request, so that the power supply side drive unit of the power supply side module may control the on-off of the first switch unit according to the authentication pass signal.

15. An electronic device, comprising a power supply side module, the power supply side module comprising a power source, a voltage output terminal connected to the power source and a first ground terminal, wherein the power supply side module further comprises a power supply side drive unit, a power generating unit, a first switch unit and a first intermediate terminal;

the power generating unit is connected between the first intermediate terminal and the power source, so as to employ the first intermediate terminal to output a target current under a power supply of the power source; the first intermediate terminal is configured to be docked with a second intermediate terminal of a receiving side module of other electronic devices, so that when the voltage output terminal is docked with a voltage input terminal of the receiving side module and the first ground terminal is docked with a second ground terminal of the receiving side module, the power generating unit, the first intermediate terminal, the second intermediate terminal, and a first resistance circuit of the receiving side module are connected to the ground in sequence to form a first loop;

the first switch unit is connected between the power source and the voltage output terminal, a sampling terminal of the power supply side drive unit is connected to the first intermediate terminal, and an output terminal of the power supply side drive unit is connected to the first switch unit; the power supply side drive unit is configured to control an on-off of the first switch unit according to a voltage of the first intermediate terminal to control the first switch unit to be turned on when the first loop is formed and to control the first switch unit to be turned off under at least a part of a circuit state where the first loop is not formed, wherein when the voltage output terminal is docked with the second ground terminal and the first ground terminal is docked with the voltage input terminal, the power generating unit, the first intermediate terminal, the second intermediate terminal, a second resistance circuit, the voltage input terminal and the first ground terminal are connected to the ground in sequence to form a second loop;

the at least a part of a circuit state where the first loop is not formed comprises at least one of:

a circuit state where the second loop is formed;

a circuit state where the first intermediate terminal does not form a loop to the outside;

a circuit state where at least two of the voltage output terminal, the first intermediate terminal, and the first ground terminal are short-circuited;

a circuit state where at least one of the voltage output terminal, the first intermediate terminal, and the first ground terminal touches a conductor other than the receiving side module;

a circuit state where at least two of the voltage input terminal, the second intermediate terminal, and the second ground terminal are short-circuited; and a circuit state where at least one of the voltage input terminal, the second intermediate terminal, and the second ground terminal touches a conductor other than the receiving side module.

16. An electronic device, comprising a receiving side module for receiving the power supply from the power supply side module of the electronic device according to claim 15, the receiving side module comprising a battery power supply unit, a voltage input terminal connected to the battery power supply unit, a second ground terminal, and a second intermediate terminal, a first resistance circuit, a receiving side drive unit, and a second switch unit;

the second intermediate terminal is connected to a first terminal of the first resistance circuit, and a second terminal of the first resistance circuit is grounded together with the second ground terminal;

the second intermediate terminal is configured to be docked with the first intermediate terminal to form the first loop when the voltage output terminal is docked with the voltage input terminal and the first ground terminal is docked with the second ground terminal; and the second switch unit is connected between the voltage input terminal and the battery power supply unit, a sampling terminal of the receiving side drive unit is directly or indirectly connected to the voltage input terminal, and an output terminal of the receiving side drive unit is connected to the second switch unit; the receiving side drive unit is configured to compare a voltage of the voltage input terminal with a preset safe voltage interval and to control the on-off of the second switch unit according to a comparison result, the preset safe voltage interval being determined according to an overvoltage protection point and a minimum undervoltage protection point of an input voltage.

17. The electronic device according to claim 16, wherein when the voltage output terminal is docked with the second ground terminal and the first ground terminal is docked with the voltage input terminal, the power generating unit, the first intermediate terminal, the second intermediate terminal, a second resistance circuit, the voltage input terminal and the first ground terminal are connected to the ground in sequence to form a second loop;

the at least a part of a circuit state where the first loop is not formed comprises at least one of:

a circuit state where the second loop is formed;

a circuit state where the first intermediate terminal does not form a loop to the outside;

a circuit state where at least two of the voltage output terminal, the first intermediate terminal, and the first ground terminal are short-circuited;

a circuit state where at least one of the voltage output terminal, the first intermediate terminal, and the first ground terminal touches a conductor other than the receiving side module;

a circuit state where at least two of the voltage input terminal, the second intermediate terminal, and the second ground terminal are short-circuited; and a circuit state where at least one of the voltage input terminal, the second intermediate terminal, and the second ground terminal touches a conductor other than the receiving side module.

\* \* \* \* \*